United States Patent [19]
Pertle

[11] 4,246,814
[45] Jan. 27, 1981

[54] ELBOW MANDREL

[75] Inventor: John E. Pertle, Garden Valley, Calif.

[73] Assignee: Tri Tool, Inc., Placerville, Calif.

[21] Appl. No.: 32,499

[22] Filed: Apr. 23, 1979

[51] Int. Cl.³ .................. B23B 3/22; B23B 41/00
[52] U.S. Cl. .................. 82/4 C; 269/48.1; 408/80
[58] Field of Search ............... 82/4 R, 4 C, 1 C; 408/80, 81, 82, 83; 51/241 VS; 269/47, 48.1

[56] References Cited

U.S. PATENT DOCUMENTS

| | | | |
|---|---|---|---|
| 2,478,318 | 8/1949 | Payne | 82/4 C |
| 4,050,836 | 9/1977 | Anders | 408/80 |
| 4,169,396 | 10/1979 | Astle | 82/1 C |

FOREIGN PATENT DOCUMENTS

198621  6/1923  United Kingdom ............... 82/4 R

*Primary Examiner*—Harrison L. Hinson
*Attorney, Agent, or Firm*—Don B. Finkelstein

[57] ABSTRACT

A mandrel arrangement for mounting a pipe machining tool for rotation relative to at least one end of a pipe bend to be machined. Locating plate means are detachably mountable on the mandrel for positioning the mandrel in the pipe bend in a predetermined location. Clamping means are provided on the mandrel for clamping the pipe means in the predetermined location. A mandrel shaft means is detachably mounted to the mandrel adjacent one or both of the ends thereof for receiving the pipe machining tool to machine the ends of the pipe bend. The locking means is cam actuated to frictionally clamp the mandrel in the pipe bend at the predetermined position and the structure of the cam operated locking means allows utilization of the pipe mandrel in comparatively small internal diameter pipe bends.

17 Claims, 16 Drawing Figures

ELBOW MANDREL

REFERENCE TO RELATED APPLICATIONS

This patent application is related to copending U.S. patent application Ser. No. 883,178, filed Mar. 3, 1978, now U.S. Pat. No. 4,169,396, issued Oct. 2, 1979 and assigned to the same assignee as this application, and to copending patent application Ser. No. 32,500, filed concurrently herewith and assigned to the same assignee as this patent application, and the teaching and technology of each is incorporated herein by reference.

BACKGROUND OF THE INVENTION

1. Field of the Invention

This invention relates to the pipe machining art, and, more particularly, to an improved mandrel arrangement useful in mounting a pipe machining tool for rotation relative to at least one end of a pipe bend to be machined and, in particular, to such a mandrel having application to comparatively small pipe bend internal diameters.

2. Description of the Prior Art

Many pipe machining tools are designed to be rotated about the center line of a pipe to accomplish a machining operation on the pipe. Two examples thereof are described in U.S. Pat. No. 3,875,832, issued Apr. 8, 1975, entitled MANUAL PIPE BEVELLING TOOL and U.S. Pat. No. 3,927,584, issued Dec. 23, 1975, entitled PIPE END FACING AND GROOVING MACHINE. U.S. Pat. No. 3,875,832 discloses a manual tool to be rotated about the axis of a pipe adjacent its end for the purpose of cutting a bevel thereon. U.S. Pat. No. 3,927,584 discloses a tool, the cutting assembly of which is adapted to rotate about the axis of a pipe to machine a square face and an external annular groove on the end of the pipe for the reception of a pipe coupling element.

In tools of this type, a mandrel is required to mount the tools for rotation. Since the mandrel shaft must be coaxial with the pipe being machined, it is easiest to mount the mandrel arrangement directly to the pipe. Such mandrels must be extremely rigid to provide an accurate cut and to withstand the substantial forces placed thereon, but should also be able to be installed and removed easily relative to a particular length of pipe. The ease of installation and removal is particularly important for use in the field, where pipes are machined with a minimum of sophisticated tools and alignment mechanisms. A mandrel must also be relatively inexpensive to justify extensive field use.

Mandrels exist for use with straight sections of pipe. U.S. Pat. Nos. 3,875,832 and 3,927,584 illustrate mandrels for use with straight sections of pipe comprising a plurality of longitudinally directed radial fins which may be expanded by tightening an axial draw bar, drawing those fins over a set of radially inclined camming surfaces. The radially outer edges of the fins may thus be caused to engage the inner surface of the pipe in a clamping relationship to rigidly fix the draw bar along the axis thereof. Either the draw bar itself or a hollow bar fitted thereover serves as a mandrel for rotation of the pipe machining tool.

The above described mandrels are unsatisfactory for use in machining the ends of pipe elbows and other pipe bends, because pipe bends generally do not possess the length of straight pipe necessary to engage and retain an expanding fin arrangement. The curved inner surfaces of pipe bends present unique and previously unsolved problems in securing a mandrel. Mandrels for such use must be accurately and rigidly mountable within a pipe bend, and must also be of a simple design allowing quick and easy installation.

Other structures are shown in U.S. Pat. Nos. 3,478,318 and 4,050,836, and in Great Britain Pat. No. 198,621.

In the above mentioned copending patent application Ser. No. 883,178, filed Mar. 3, 1978, now U.S. Pat. No. 4,169,396, issued Oct. 2, 1979, and assigned to the same assignee as this patent application, there is described an elbow mandrel for overcoming the above mentioned deficiencies and useful in a wide variety of pipe bends. However, it has been found that in certain applications involving pipe bends having a comparatively small internal diameter, the structure of the above described mandrel does not lend itself to all such applications, since the mandrel must be sufficiently strong to withstand the forces associated with its use and yet small enough to be removably insertable in a pipe bend. Therefore, while certain basic dimensions of the pipe mandrel may be scaled down when adapted for utilization in smaller pipe bends, the amount of decrease in physical size to allow insertion into smaller diameter pipe bends is limited by the strength required in the structure to withstand the above mentioned forces.

SUMMARY OF THE INVENTION

Accordingly, it is an object of the present invention to provide an improved mandrel arrangement for mounting a pipe machining tool for axial rotation relative to an open end of the pipe bend.

It is yet another object of the present invention to provide an improved mandrel arrangement which may be fitted within a pipe bend having comparatively small internal diameter.

It is yet another object of the present invention to provide a mandrel arrangement for use in machining the ends of a pipe bend, which mandrel arrangement may be fitted within the pipe bend and easily aligned and secured in place relative thereto.

It is still a further object of the present invention to provide an improved mandrel arrangement for mounting a pipe machining tool for rotation relative to a pipe bend in which the pipe bend has a comparatively small internal diameter and the mandrel is of sufficient strength to withstand the forces associated with the machining of the ends of the pipe bend.

The above and other objects of the present invention are achieved, in accordance with the preferred embodiment thereof, by providing a mandrel frame which may be fitted within the pipe bend and detachably secured relative thereto. The mandrel frame includes means for mounting a mandrel shaft projecting outwardly from at least one end of the frame and the pipe machining tool is mountable upon the mandrel shaft to provide machining of the ends of the pipe bend.

The frame is provided with first and second flange portions joined together by a web portion. The outside surface of each of the flange portions lie in a predetermined plane and the planes of the outside surface of the flange portion make a predetermined angle, which angle corresponds to the angle of the pipe bend desired to be machined. For example, if the pipe bend is a 90° elbow, then the planes of the outside surfaces of the flange portions intersect at 90°.

A locating plate means is provided for positioning the frame within the pipe bend at a predetermined location therein with respect to the ends of the pipe bend. The locating plate is preferably detachably mountable onto the frame. A locking means is provided for detachably clamping the frame means within the pipe bend after the predetermined location has been achieved by utilization of a locating plate.

A mandrel shaft is detachably mountable on the frame means and positionable at a plurality of positions relative to the ends of the pipe bend, which plurality of positions includes positions corresponding to the nominal center line of the pipe bend and the center line with respect to the inside diameter of the end of the pipe bend and the center line with respect to the outside diameter of the pipe bend. The centering device is utilized to position the mandrel shaft means so that the axis thereof corresponds to the desired center line of the end of the pipe bend, for example, the center line corresponding to the inside diameter or the outside diameter. The pipe machining tool is then mounted upon the mandrel shaft and machining of one end of the pipe bend may be completed. The mandrel shaft may then be removed and, if the other end of the pipe bend is accessible, mounted on the opposite end of the frame means adjacent the other end of the pipe bend and centered to a selected center line as desired. The other end of the pipe bend may be machined. After machining the ends of the pipe bend, the locking means is released and the mandrel may be removed from the pipe bend.

The locking means in the present invention generally comprises a clamping means selectively movable between a retracted position wherein the clamping means is free of engagement with the inside surface of the pipe mandrel and a clamping position wherein the clamping means frictionally engages the inside surface of the pipe bend. The clamping means is actuated by a cam means mounted on the frame means and operatively engages the clamping means for moving the clamping means between the retracted position and the clamping position. A cam control means is movably mounted on the frame means and accessible for manual actuation through one of the first and second flange portions of the frame means. The flange portions of the frame means may be provided with detachable projections on peripheral surfaces thereof. When the clamping means is in the clamping position thereof, the projections on the first and second flange portions of the web means are brought into engagement with the inside surface of the pipe bend and the clamping action for frictionally retaining the frame means within the pipe bend is achieved by the engagement of the clamping means and the projections with the inside surface of the pipe bend.

The mandrel arrangement of the present invention may also be utilized to machine an end of a pipe bend whose other end has been welded to a run of pipe and is therefore inaccessible. In such an application, the frame means is fitted within the pipe bend and rotated at a predetermined rotation with respect thereto by utilization of the above mentioned locating plate means. The mandrel shaft is then positioned therein so that the mandrel shaft means projects outwardly from the open end of the pipe bend. The mandrel shaft may then be aligned within a plane perpendicular to the run of the pipe connected to the inaccessible end of the pipe bend by utilization of a squaring gage fitted to the run of the pipe and a spirit level to determine perpendicularity.

BRIEF DESCRIPTION OF THE DRAWING

The above and other objects of the present invention may be more fully understood when the following detailed description is taken together with the accompanying drawing, wherein similar referenced characters refer to similar elements throughout, and in which.

DESCRIPTION OF THE PREFERRED EMBODIMENT

Referring now to the drawing, there is illustrated in FIGS. 1 through 12 thereof, a preferred embodiment of the present invention, generally designated 10. It will be appreciated that for purposes of describing the preferred embodiment 10, the embodiment is shown as utilized in and designed for a 90° pipe elbow. However, it will be appreciated that the present invention is not so limited, and may be utilized advantageously in pipe bends having angles other than 90°.

Figure 1:
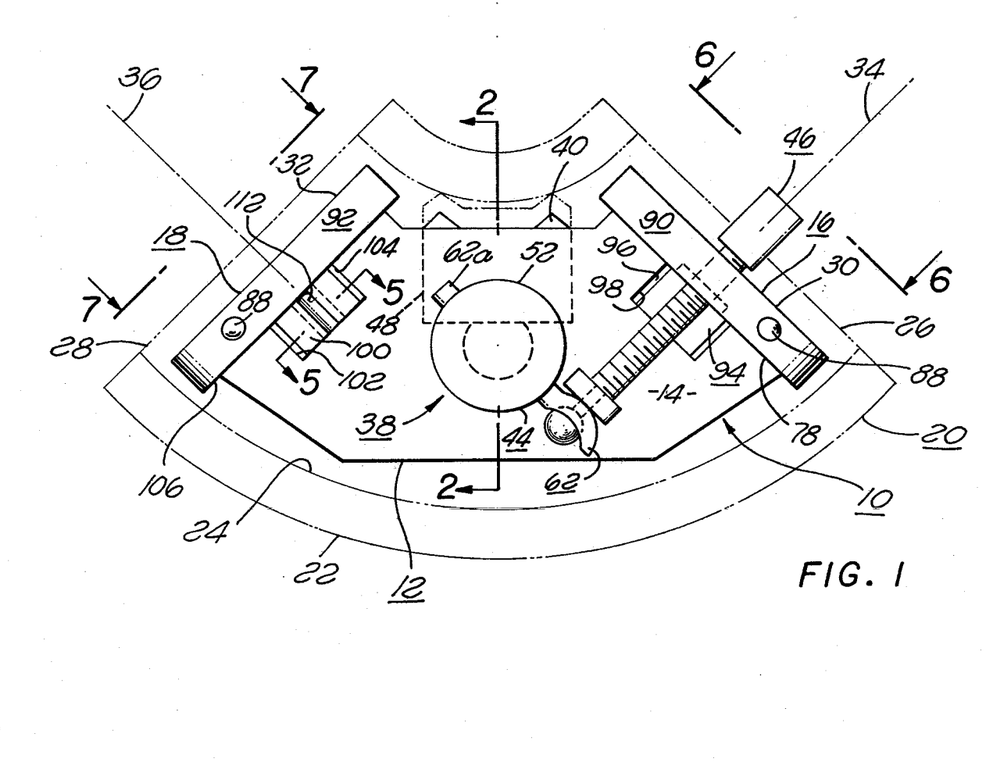
FIG. 1 illustrates a preferred embodiment of the present invention as installed in a pipe bend.

The embodiment 10 of a mandrel arrangement according to the present invention is generally comprised of a frame means 12 having a web portion 14, a first flange portion 16 coupled to the web portion 14 and a second flange portion 18 coupled to the web portion 14. In FIG. 1, the frame means 12 is shown installed in a pipe elbow 20, illustrated in phantom lines and the pipe elbow 20 has an outside surface 22, an inside surface 24, a first end portion 26 and a second end portion 28. The frame means 12 is to be positioned, according to the principles of the present invention, in a predetermined location, as hereinafter set forth, with respect to the first end 26 and the second end 28 of the pipe bend 20.

The first flange portion 16 has an outer surface 30, lying in a first plane and the second flange portion 18 has an outer surface 32, lying in a second plane. The first plane containing the outer surface 30 of first flange portion 16 intersects the second plane containing the outer surface 32 of the second flange portion 18 at a predetermined angle corresponding to the angle of the pipe bend 20. For the embodiment illustrated in FIG. 1, as noted above, this angle is 90°. The first end 26 of the pipe bend 20 has a first axis 34 and the second end 28 of the pipe bend 20 has a second axis 36. If the pipe bend 20 were perfectly manufactured, the first axis 34 would correspond to and be colinear with both the axis of the outer surface 22 at the first end 26 and the inner surface 24 at the first end 26. Similarly, if the pipe bend 20 were perfectly manufactured, the second axis 36 would correspond to and be colinear with the axis of the outer surface 22 at the second end 28 and the inner surface 24 at the second end 28, and would be coplanar with the first axis 34. However, the manufacturing tolerances of many pipe bends commercially utilized result in pipe bends 20 which have ends lying in planes that may vary in all three dimensions from the correct planar relationship and the axes thereof do not have such colinearity and often are not coplanar. Consequently, it is one of the advantages of the present invention to allow installation of the frame means 14 within the pipe bend 20 so that the first end surface 26 and the second end surface 28 of the pipe bend 20 may be machined, for example, bevelled, to allow for welding to pipe runs, in which the first axis 34 is colinear with either the axis of the inside surface 24 of the axis of the outside surface 22, as may be desired, the second axis 36 is colinear with either the axis of the inside surface 24 or the axis of the outside surface 22, as may be desired, and that the first axis 34 and second axis 36 are perpendicular to the plane of the respective end surfaces of the pipe bend 20 after machining, and that the planes of the end surfaces intersect at the nominal angle of the pipe bend 20, for example, 90° with each other when utilized in a pipe bend 20 that is a nominal 90° pipe elbow.

It will also be appreciated that deviations of the ends 26 and 28 of pipe bend 20 from true circular dimensions to both the inside surface 24 and the outside surface 22 may also occur due to manufacturing tolerance. The present invention may be utilized in such pipe bends as long as the wall thickness is such as to allow proper bevelling, or other machining, on a true circle about the axes 34 and 36.

To achieve the above desired results, the frame means 12 is provided with a locking means generally designated 38, comprised of a clamping means 40, movably mounted on the web portion 14 of the frame means 12 between a retracted position as shown in solid lines in FIG. 1 and a clamping position as shown in dotted lines on FIG. 1, as indicated at 42. In the retracted position as shown in solid lines, the clamping means 40 is free of engagement with the inside surface of the pipe bend 20. In the clamping position, the clamping means 40 engages the inside surface 24 of the pipe bend 20. The clamping means 40 is moved between the engaging positions and clamping positions thereof by a cam means 44 that operatively engages the clamping means 40, as described below in greater detail, and the cam means 44 is controlled by a cam control means 46, which is described below in greater detail, and provides the rotation of the cam means 44.

Figure 2:
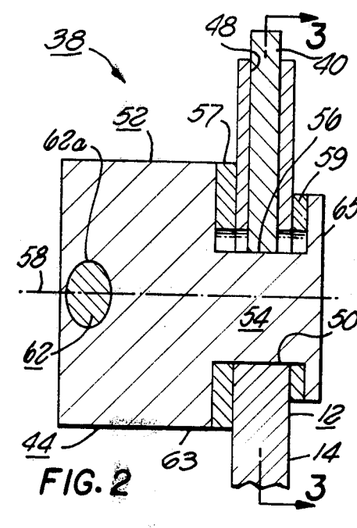
FIG. 2 is a sectional view along the line 2—2 of FIG. 1.
Figure 3:
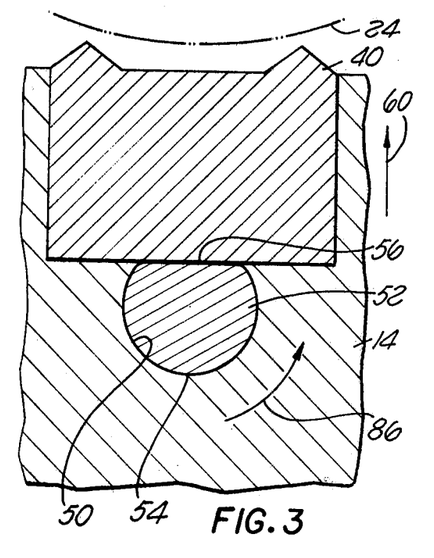
FIG. 3 is a sectional view along the line 3—3 of FIG. 2.
Figure 4:
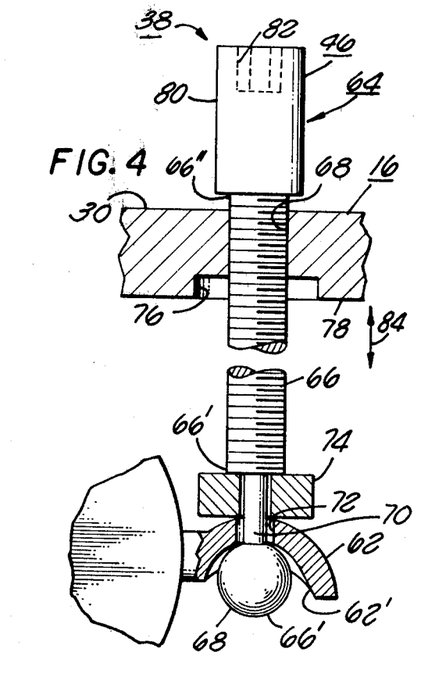
FIG. 4 illustrates a cam control means useful in the practice of the present invention.

FIGS. 2, 3 and 4 illustrate the details of the locking means 38 according to the principles of the present invention. The frame means 14 is provided with walls 48 defining a clamping means receiving slot in which the clamping means 40 is movably mounted. The web portion 14 of the frame means 12 is also provided with walls defining a cam receiving aperture 50, in which the generally cylindrical cam member 52 is mounted. The cam member 52 has a generally cylindrical cam engaging portion 54 and a generally flat portion 56. The cam member 52 is rotatable about the cam axis 58 and washers 57 and 59 may, if desired, be interposed between a headed portion 63 and foot portion 65, respectively, thereof and the web 14. In FIGS. 2 and 3, the cam member 52 is shown with the flat portion 56 engaging the clamping means 40 and this position corresponds to the retracted position of the clamping means 40. As the cam member 52 is rotated about the axis 58, in the direction of the arrow 86, the engaging portion 50 comes into contact with the clamping means 40 and moves the clamping means 40 in the direction indicated by the arrow 60 to the clamping position thereof where it engages the inside surface 24 of pipe bend 20. Thus, the cam member receiving aperture 50 communicates with the clamping means receiving slot 48 to allow the movement of the engaging portion 54 of the cam member 52 therein. Thus, the clamping means 40 is moved a maximum distance corresponding to the difference between the distance from the axis 58 to the flat 56 and the radius of the generally cylindrical engaging portion 54. This distance, together with the maximum height of the clamping means 40 is selected so that the frame means 12 may be positioned within the pipe bend 20 for the smallest sized internal diameter of the pipe bend 20 in which the embodiment 10 is to be utilized.

The cam control means generally designated 46 is more clearly illustrated in FIG. 4 and as shown therein is generally comprised of an arm member 62 having a first end 62a, coupled to the headed portion 63 of the cam member 52 and extending outwardly therefrom. The remote end 62' of the arm member 62 is mounted on an actuator member generally designated 64 having a threaded body portion 66 that threadingly engages an aperture 68 in the first flange portion 16. The inner end 66' of the actuator member 64 is coupled to the outer end 62' of the arm member 62 by way of the enlarged ball-like portion 68 mounted on a shaft 70 which is coupled to the inner end 66' of the threaded body portion 66. The shaft 70 passes through an aperture 72 in the arm member 62 which is of larger dimension than the shaft 70 to allow relative movement therebetween. If desired, a washer means 74 may be interposed between the threaded body portion 66, which has a larger diameter than the shaft 70, and the arm 62 as shown in FIG. 4. Walls 76 may be provided in the inner surface 78 of first flange 16 for accepting the washer 74 during movement of the cam 44. The outer end 66'' of the threaded body portion 66 is provided with a headed portion 80 having, for example, a hex slot 82 therein. Operation of the locking means 38, according to the principles of the present invention, is readily apparent. A hex driver may be inserted in the hex slot 82 and rotated. The threaded body portion 66 threadingly engaging the threaded aperture 68 of the first flange portion 16 moves the actuator member 64 in directions indicated by the double ended arrow 84. As the arm 62 is drawn upwardly toward the inner surface 78 of the first flange portion 16, the cam member 52 is rotated in a direction indicated by the arrow 86 in FIG. 3, thereby moving the clamping means 40 in the direction of the arrow 60 from the retracted position shown in FIG. 3 to the clamping position thereof wherein the clamping means 40 is in engagement with the inner surface 24 of the pipe bend 20.

Projections 88 are provided on peripheral surfaces 90 of first flange portion 16 and 92 of second flange portion 18, and cooperate with the clamping means 40. As the clamping means 40 moves into the clamping position thereof wherein it engages the inner surface 24 of the pipe bend 20, the projections 38 on the first flange portion 16 and second flange portion 18 are brought into engagement with the inner surface 24 of the pipe bend 20, thereby clamping the frame means 12 therein.

In order to position the frame means 12 within the pipe bend 20 at a desired location and position, a locating plate means is provided detachably mountable on the frame means 12.

Figure 5:
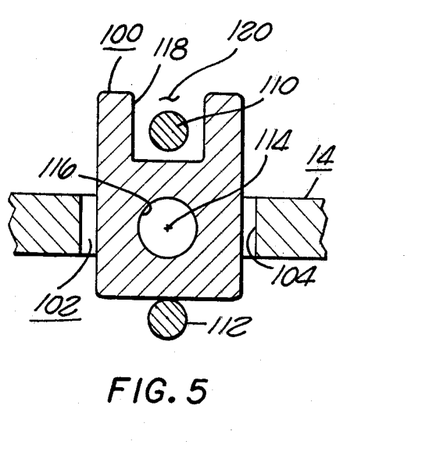
FIG. 5 illustrates a floating nut useful in the practice of the present invention.

Mounting means are provided on the frame means 12 for allowing the detachable mounting of a locating plate means thereon. The mounting means generally comprises a first floating nut 94 mounted in an aperture 96 defined by walls 98, adjacent the inner surface 78 of the first flange portion 26 and a second floating nut 100, mounted in an aperture 102, defined by walls 104, adjacent the inner surface 106 of second flange portion 18. First floating nut means 94 and second floating nut means 100 are substantially identical in configuration and are retained within the apertures 96 and 102, respectively, by similar structure. FIG. 5 illustrates the structure for retaining second floating nut means 100 in the aperture 102 in web portion 14 of frame means 12. A pair of pin means 110 and 112 extend between the inner surface 106 of second flange portion 13 and the walls 104, defining the aperture 102. The walls 104 and pin means 110 and 112 comprise limiting means for limiting the movement of floating nut means 100 in planes substantially parallel to the outer surface 32 of second flange portion 18 in order to provide that the axis 114 of a threaded aperture 116 in second floating nut means 100 is substantially perpendicular to the outer surface 32 of second flange portion 18. Second floating nut means 100 also has walls 118 defining a pin receiving aperture 120 in which pin means 110 is positioned. As shown in FIG. 5, second floating nut means 100 is thus free to move within the aperture 102 and is constrained therein by the positioning of the pins 110 and 112. Second floating nut means 100 can thus be positioned at an infinite number of positions within the aperture 102 and at least one of such positions corresponds to alignment with the center line 36.

Figure 6:
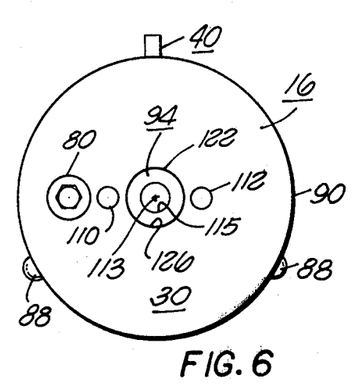
FIG. 6 is a view along the line 6—6 of FIG. 1.
Figure 7:
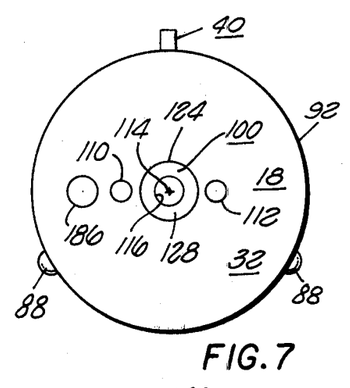
FIG. 7 is a view along the line 7—7 of FIG. 1.

As shown more clearly in FIGS. 6 and 7, first and second flange portions 16 and 18, respectively, are provided with first walls 122 and 124, respectively, defining apertures 126 and 128, respectively, extending through the first flange portion 16 and second flange portion 18, respectively, from the outer surfaces 30 and 32 thereof, to the inner surfaces 78 and 106, respectively. The apertures 126 and 128 are access apertures having a diameter larger than the threaded apertures 115 and 116 in first floating nut means 94 and second floating nut means 100, respectively. Thus the threaded apertures 115 and 116 may be threadingly engaged through the access apertures 126 and 128 and lie within the projections thereof.

Figures 8, 9, 10:
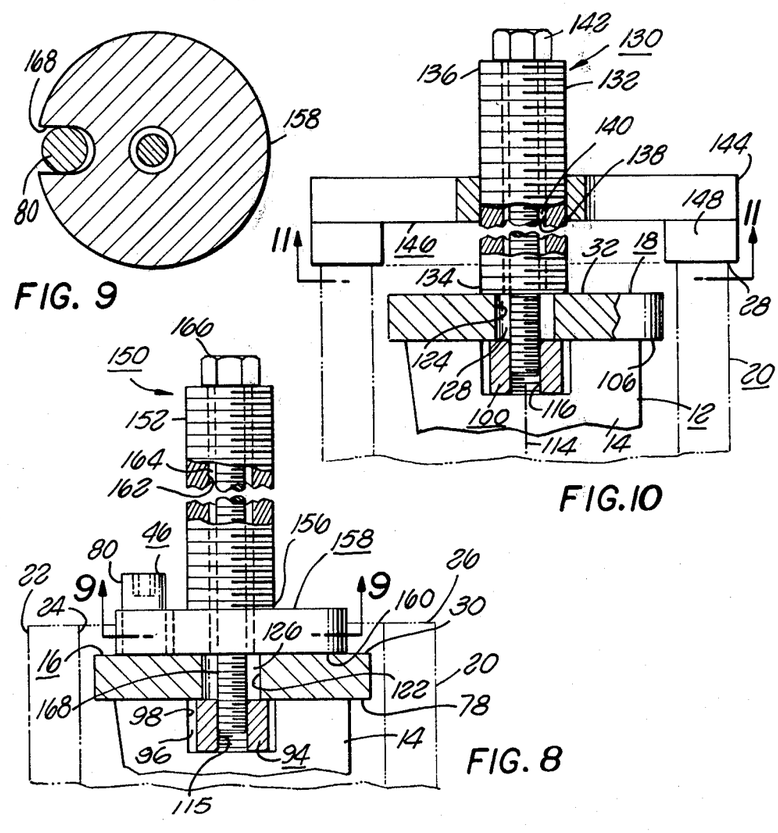
FIG. 8 illustrates a mandrel shaft means useful in the practice of the present invention.
FIG. 9 is a sectional view along the line 9—9 of FIG. 8.
FIG. 10 illustrates a locating plate means useful in the practice of the present invention.
Figure 11:
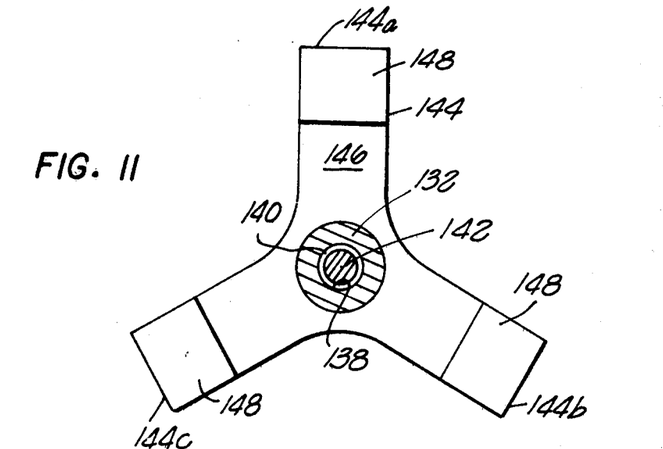
FIG. 11 is a view along the line 11—11 of FIG. 10.

The first floating nut means 94 and second floating nut means 100 are utilized to provide for detachable mounting of both the mounting plate means and the mandrel shaft means. FIGS. 10 and 11 illustrate a locating plate means generally designated 130 which may be detachably mounted on the frame means 12. As shown in FIGS. 10 and 11, the locating plate means 130 is generally comprised of an externally threaded body member 132 having an inner end 134 and an outer end 136. Externally threaded body member 132 is also provided with walls 138 defining a bolt receiving aperture 140 therethrough, extending from the outer end 136 to the inner end 134. A locating plate bolt means 142 is positionable within the bolt receiving aperture 140 and is threadingly engageable with the threaded aperture 116 of second floating nut means 100 through the access aperture 124 in second flange portion 18. The locating plate bolt means 142 is, similarly, threadingly engageable with the threaded aperture 115 in first floating nut means 94 through the access aperture 126 in first flange portion 16. The spinner plate means 144 is threadingly engageable with the externally threaded body member 132 and has an inner surface generally designated 146 comprising a bearing surface for bearing against the outer end 28 of the pipe bend 20. As shown in FIG. 11, spinner plate 144 is generally a three lobed plate having three arms 144a, 144b and 144c. It will be appreciated, however, that variations in the number of arms, preferably not less than three, may be utilized as the spinner plate 144, as may also be utilized a solid, disc-like member. Stand-off plates 148 may be utilized on the extremities of the arms 144a, 144b and 144c, in order to provide engagement with the outer end 28 of the pipe bend 20 and provide sufficient clearance for the headed portion 80 of the threaded body portion 66 of the cam control means 46 (FIG. 4). When locating bolt means 42 is drawn up tight in second floating nut means 100, the inner end 134 of the externally threaded body member 132 is brought into engagement with the outer surface 32 of second flange portion 18. Thus, the axis of the externally threaded body member 132 is perpendicular to the external surface 32 of second flange portion 18. The spinner plate 144 may then be rotated so that the engagement surface 146 of the spinner plate 144 engages the end 28 of the pipe bend 20. The inner surface 146 of the spinner plate 144 is in a plane perpendicular to the axis of the externally threaded body member 132 and thus parallel to the outer surface 32 of the second flange portion 18. Thus, when engagement of the spinner plate 144 with the end 28 of the pipe bend 20 is made, the outer surface 32 of second flange portion 18 lies in a plane parallel to the end 28 of the pipe bend 20. It will be appreciated that during the tightening of the spinner plate 144 against the pipe bend 20, the clamping means 40 is in its retracted position and the projections 88 of the peripheral surfaces of the first and second flange portions 16 and 18 are not in engagement with the inner surface of the pipe bend 20 and thus the entire mandrel arrangement 10, as shown in FIG. 1, is free to move within the pipe bend 20 to achieve the above mentioned alignment wherein the outer surface 32 of the second flange portion 18 lies in the plane parallel to the end surface 28 of the pipe bend 20. It will be appreciated, further, that the locating plate means 130 may also be utilized with the first flange portion 16 to align the outer surface 30 thereof in a plane parallel to the first end 26 of the pipe bend 20. When the desired parallel alignment of the outer surface 32 of the second flange 18, as above described, is achieved, the locking means 38 is utilized to bring the clamping means 40 into engagement with the inner surface 24 of the pipe bend 20 and the projections 88 into engagement with the inner surface 24 of the pipe bend 20, thereby rigidly clamping the frame means 12 within the pipe bend 20. Since the outer surfaces 30 and 32 of the first flange portion 16 and second flange portion 18, respectively, lie in planes making the predetermined angle of the pipe bend 20 with each other, machining of each end 26 and 28 of the pipe bend 20 with the frame means 12 clamped in the position above described, will provide the end surfaces 26 and 28 of the pipe bend 20 in planes that make the predetermined angle of the pipe bend 20 with each other despite manufacturing variations therefrom. In order to machine the ends 26 and 28 of the pipe bend 20, it will be appreciated that the frame means 12 is maintained in the pipe bend 20 in the clamped condition thereof while each end of the pipe bend 20 is machined. The locating plate means 130 may be removed from the frame means 12 after the frame means 12 has been clamped into position within the pipe bend 20.

In order to provide for the machining of the ends 26 and 28 of the pipe bend 20, the mandrel shaft means generally designated 150, as shown on FIGS. 8 and 9, is detachably mounted on the frame means 12, after the frame means 12 has been clamped into position, as above described, within the pipe bend 20. As shown in FIGS. 8 and 9, the mandrel shaft means 150 generally comprises an externally threaded body member 152 for receiving, as described below in greater detail, a pipe machining tool thereon. The threaded body member 152 has an outer end 154 and an inner end 156. A base member 158 is coupled to the inner end 156 of the body member 152 and the base member 158 has an outer surface 160 engageable with the outer surface 30 of first flange portion 16 and outer surface 32 of second flange portion 18. As shown in FIGS. 8 and 9, the mandrel shaft means 150 is shown detachably mounted on the first flange portion 16. The outer surface 160 of base member 158 lies in a plane substantially perpendicular to the axis of the threaded body member 152. Thus, for the condition shown in FIG. 8, where the outer surface 160 of the base member 158 engages the outer surface 30 of the first flange portion 16, the axis of the threaded body portion 152 is perpendicular to the outer surface 30 of the first flange portion 16. Walls 162 defining a drawbolt receiving aperture 164 extend through the body member 152 and base member 158 from the outer end 154 to the outer surface 160. A drawbolt 166, having a threaded inner end 168 is positionable within the drawbolt receiving aperture 164 and threadingly engages the first floating nut means 94 in threaded aperture 115 thereof. In order to prevent rotation of the mandrel shaft means 150 when the pipe machining tool is mounted thereon for machining the end 26 of the pipe bend 20, the base member 158 is also provided with walls 168 defining a peg receiving aperture for engaging a peg which, with the mandrel shaft means 150 is installed adjacent the first flange portion 16, comprises the headed portion 80 of the cam control means 46.

Figure 12:
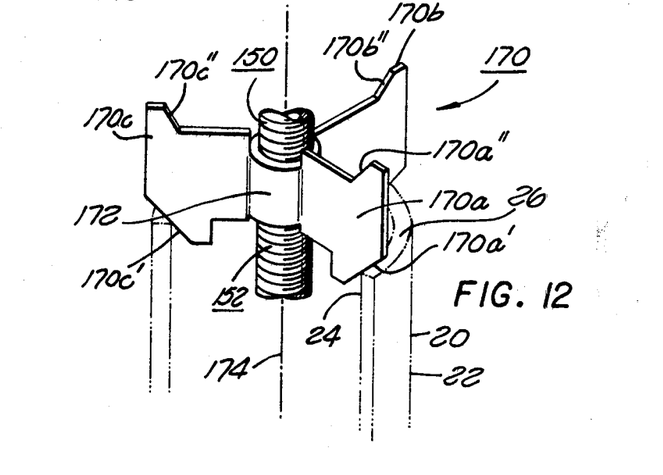
FIG. 12 illustrates a centering device useful in the practice of the present invention.

As noted above, the floating nut means 94 moves in a plurality of positions with respect to the access aperture 126 to allow proper centering of the mandrel shaft means 150. Thus, the mandrel shaft 150 may be centered with respect to the inside surface 24 or the outside surface 22 of the pipe bend 20, depending upon the particular application. In order to achieve centering of the mandrel shaft 150 with respect to either the inside surface 24 or the outside surface 22 of the pipe bend 20, a centering unit is utilized in conjunction with the mandrel shaft means 150. The centering unit is illustrated in FIG. 12 and is generally designated 170. The centering unit 170 has three vanes 170a, 170b, and 170c, all substantially identical. The centering vanes 170a, 170b and 170c extend longitudinally of and radially from the tubular center member 172, which is adapted to slidingly engage the threaded body portion 152 of the mandrel shaft 150. The outer radial extremity of each of the three vanes 170a, 170b and 170c are longitudinally tapered toward the axis 174 of the tubular center member 172 to engage the inner surface 24 of the pipe bend 20 at the end 26 thereof, as shown in FIG. 12. These portions for engaging the inner surface 24 are designated 170a', 170b' and 170c'. The opposite ends of each of the centering vanes 170a, 170b, 170c are undercut to form longitudinally inward facing tapered surfaces, generally designated 170a", 170b" and 170c" and the tapers thereof progress generally outwardly and are engageable with the outer surface 22 at the second end 26 when the centering unit 170 is turned end for end from the condition shown in FIG. 12. Thus, the centering unit may be utilized to provide centering with respect to either the inside surface 24 or outside surface 22 of the pipe bend 20 at either the first end 26 or second end 28, depending upon which end the mandrel shaft means 150 is mounted.

Figure 14:
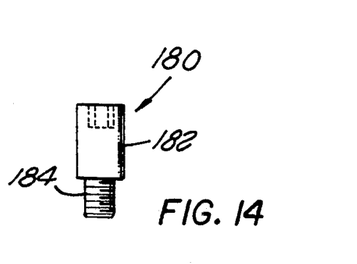
FIG. 14 illustrates a peg means useful in the practice of the present invention.

When the mandrel shaft means 150 is to be detachably mounted onto the frame means 12, the drawbolt 166 is inserted through the drawbolt aperture 164 and it engages the floating nut means 94. The drawbolt 16 is loosely tightened into the floating nut means 94 and the centering unit 170 is slid over the threaded body member 152. When the inside surface engaging portions 170a', 170b' and 170c' engage the inner surface 24 of the pipe bend 20 at the end 26 thereof, or, alternatively, when the outside surface engaging portions 170a", 170b" and 170c" engage the outside surface 22 of pipe bend 20 at the end 26 thereof, the floating nut means 94 moves to accommodate such a position and thus aligns the mandrel shaft 150 with the end of the inside surface 24 or outside surface 22 of the pipe bend 20. When this condition is achieved, the drawbolt 166 is tightened, forcing outer surface 160 of the base portion 158 against the outer surface 30 of the first flange portion 16. The mandrel shaft 150 is therefore rigidly clamped to the frame means 12 and the pipe machining tool may be mounted thereon. In order to prevent rotation of the mandrel shaft 150 during operation of the pipe machining tool, as described below, the walls defining the pipe receiving aperture 168 in the base portion 158 of mandrel shaft means engages the peg means. For the condition shown in FIG. 8 where the mandrel shaft means 150 is utilized adjacent the first flange portion 16, the headed portion 80 of the cam actuator means 46 comprises the peg means which engages the walls defining the peg receiving aperture 168 to prevent rotation of the mandrel shaft means 150. However, when the mandrel shaft means 150 is mounted on the second flange portion 18, the peg means 180, illustrated in FIG. 14, having an enlarged headed portion 182 and a threaded shaft 184 is utilized by engaging the threaded shaft 184 into an appropriately threaded aperture 186 (shown on FIG. 7) and the headed portion 182 then engages the walls defining the peg receiving aperture in the base portion 158 of the mandrel shaft means 150 to prevent rotation thereof during machining of the ends of pipe bend 20.

It will be appreciated, from the above description, that, after the frame means 12 is clamped within the pipe bend 20, both the mounting plate means 130 and the mandrel shaft means 150 may be detached and/or reattached thereto, as desired, without disturbing the predetermined alignment achieved when the frame means 12 was clamped into position within the pipe bend 20. Thus, the mandrel shaft means 150 may be utilized on the first end 26 of the pipe bend 20, removed therefrom, re-installed on the second flange portion 18 and thus allow machining of the second end 28 of the pipe head 20. The floating nut means 94, floating nut means 100 insure that the mandrel shaft means 150 may be positioned adjacent the first end 26 and second end 28, respectively of pipe bend 20, with the axis of the mandrel shaft means 150 colinear with the axis 34 of the first end 26 and with axis 36 of the second end 28 of the pipe bend 20, respectively.

Figure 15:
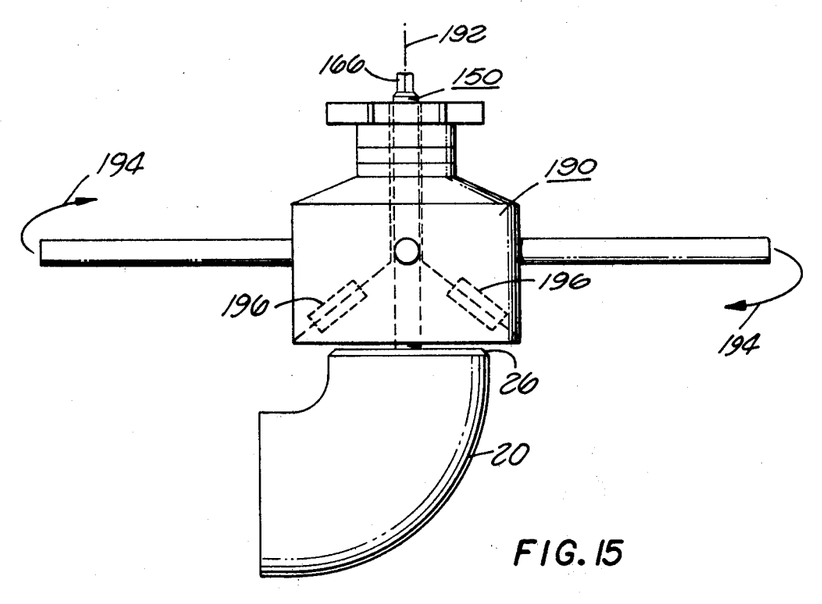
FIG. 15 illustrates the embodiment as shown in FIG. 1, with a pipe machining tool mounted on the mandrel shaft.

Referring now to FIG. 15, there is generally illustrated thereon the actual machining of an end, such as end 26 of the pipe bend 20 in accordance with the principles of the present invention. After the frame 12 has been installed within the pipe bend 20 and the mandrel shaft means 150 mounted thereon, as above described, the pipe bevelling tool, generally designated 190, is mounted on the mandrel shaft means 150 for rotation thereabout. To achieve this mounting, concentrically with the axis 192 of the mandrel shaft means 150, the pipe bevelling tool 190 may threadingly engage the threaded body member 152 of the mandrel shaft means 150 and may be rotated in the direction indicated by the arrows 194 until the cutters 196 engage the end surface 26 of the pipe bend 20. Continued rotation of the pipe machining tool 190 thus provides a bevel to the end 26 of the pipe bend 20 as shown on FIG. 15. It will be appreciated, of course, that other tool bits can be utilized in place of the bevelling tool bit 196 to provide any desired end preparation of the pipe bend 20.

Figure 16:
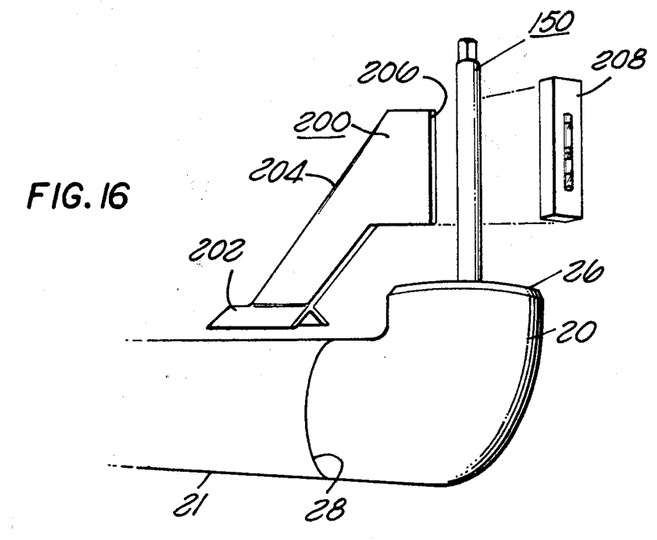
FIG. 16 illustrates the utilization of the present invention in an application where one end of a pipe bend is connected to a run of pipe.

FIG. 16 illustrates utilization of the elbow mandrel in accordance with the principles of the present invention in an application where one end of the pipe bend 20 is not accessible, for example, it is connected to a pipe run 21. In such an application as illustrated in FIG. 16, the locating plate means 130 is first installed locating the mandrel within the pipe bend 20, adjacent the accessible end 26 thereof, in the manner as heretofore set forth. The locating plate 130 is then removed and the mandrel shaft means 150 is installed. A squaring gage 200 is used to orient the mandrel shaft means 150 with respect to the pipe run 21 connected to the second end 28 of the pipe bend 20. The squaring gage 200 has a short section of angle iron 202 connected to the plate 204. The section of angle iron 202 is positioned on the surface of the pipe run 21 with the outer edges of its flange portions receiving the external surface of the pipe run 21 in generally axial directions thereof. The plate 204 has the gage edge 206 which is perpendicular to the angle iron 202 and is adapted to be placed adjacent to the mandrel shaft means 150 when the angle iron 202 is aligned on the pipe run 21 as above described. If the mandrel shaft means 150 is not properly aligned with the gage edge 206, the mandrel shaft means 150 may be loosened in its mounting on the frame means 12 and the clamping means 38 may be moved to the retracted position so that both the frame means 12 and the mandrel shaft means 150 are movable. Adjustment is made in the position of the frame means 12 within the pipe bend 20 until alignment of the mandrel shaft means 150 is achieved with the gage edge 206. When this condition is achieved, the frame means 12 is clamped within the pipe bend 20 and the mandrel shaft means 150 is tightened within the frame means 12. The pipe bevelling, or other pipe end preparation or machining tool, such as the pipe machining tool 190 shown in FIG. 15 is then installed on the mandrel shaft means 150 for proper machining of the end 26 of the pipe bend 20. A spirit level 208 may be utilized as desired to aid in the alignment of the mandrel shaft means 150.

Figure 13:
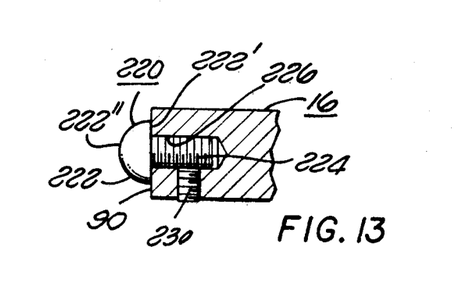
FIG. 13 illustrates the replaceable projection useful in the practice of the present invention.

The projections 88 on the peripheral surfaces of the first flange portion 16 and the second flange portion 18 may be either fixed or detachable. If they are made detachable, then the radial extent of the projections 88 may be selected so that, together with the radially extending projections on the clamping means 40, the same basic frame means 12 may be utilized in a variety of internal pipe diameters. To this purpose, the projections 88 may be made in sets of four, for example, two being mounted on each of the first and second flange portions 16 and 18. A corresponding clamping means 40 may be included as part of the same set. FIG. 13 illustrates a removable projection means 220 installed in, for example, first flange portion 16. The removable projection means 220 has a headed portion 222 and a threaded portion 224 that threadingly engages threaded aperture 226 in first flange 16. A shoulder 222' of the removable projection 220 abuts against the peripheral surface 90 of the first flange portion 16 and extends radially outwardly therefrom a preselected distance. A set screw 230 may be utilized as shown in FIG. 13 to retain the removable projection means 220 in place. Proper selection of the sets of removable projection means 220 having different radial extensions from the shoulder 222' to the tip 222'', together with the appropriate clamping means 40 extends the utility of the mandrel arrangement 10 by allowing the same basic frame means 12 to be utilized in a variety of internal pipe diameters. The radial extent of the clamping means 40 and removable projections means 220 are selected, of course, so that the threaded apertures in the floating nut means 94 and 100 may be aligned in at least one position corresponding to the axis of the ends of the pipe bend 20.

This concludes the description of the preferred embodiments of the present invention. From the above, it can be seen that there has been provided an improved mandrel arrangement to mount pipe machining tools for rotation relative to the open ends of comparatively small pipe bends. A mandrel arrangement may be utilized in the shop or in the field to quickly, accurately and economically provide an alignment device to allow machining of one or both ends of a pipe bend so that the machined ends of the pipe bend have a predetermined relationship to each other independently of manufacturing variations resulting from the manufacture of the pipe bend. In those applications where both ends of the pipe bend are accessible, the mandrel arrangement need not be removed from the pipe bend until both ends of the pipe bend have been appropriately machined. Those skilled in the art may find many variations and adaptations of the present invention and the appended claims are intended to cover all such variations and adaptations falling within the true scope and spirit of the invention.

What is claimed is:

1. A mandrel for mounting a pipe machining tool for rotation relative to at least one end of a pipe bend to be machined, and said pipe bend having an inside surface, and an outside surface, comprising, in combination:

a frame means having a web portion and a first and second flange portion coupled to opposite ends of said web portion, said first flange portion having an outer surface in a first plane, an inner surface spaced from said outer surface and adjacent said web portion, and a peripheral edge surface, said second flange portion having an outer surface in a second plane at a predetermined angle with said first plane, an inner surface spaced from said outer surface and adjacent said web portion and a peripheral edge portion, and said frame means positionable within said pipe bend with said outer surface of said first flange portion adjacent a first end of said pipe bend and said outer surface of said second flange portion adjacent a second end of said pipe bend;

locking means mounted on said frame means, and said locking means comprising:
  a clamping means movably mounted on said frame means and movable between a retracted position wherein said clamping means is substantially free of engagement with said inside surface of said pipe bend, and a clamping position wherein said clamping means frictionally engages said inside surface of said pipe bend;
  cam means rotatably mounted on said frame means and operatively engaging said clamping means for moving said clamping means between said retracted position and said clamping position thereof; and
  cam control means movably mounted on said frame means and operatively engaging said cam means for rotating said cam means;

projection means on said peripheral edge surface of said first flange portion and said second flange portion for frictionally engaging said inside surface of said pipe bend for said clamping means in said clamping position thereof to frictionally retain said frame means in said pipe bend to prevent relative movement therebetween;

mandrel shaft means detachably mountable on said frame means for receiving said pipe machining tool for rotation about the axis of said mandrel shaft means, mounting means on said frame means for adjustably mounting said mandrel shaft means to at least one of said first and second flange portions of said frame means to provide said mandrel shaft means extending substantially perpendiculary outwardly from said outer surface of said at least one of said first and second flange portions;

locating plate means detachably mountable on said frame means and having an engaging surface for engaging the ends of said pipe bend to position said frame means with respect thereto;

whereby said frame means may be positioned at a predetermined orientation with respect to said pipe bend and clamped in said predetermined position to prevent relative movement of said frame means with respect to said pipe bend, and said mandrel shaft means may be adjusted to predetermined positions on said frame means to receive said pipe machining tool for rotation thereabout.

2. The arrangement defined in claim 1, wherein:
said frame means further comprises:
  walls defining a clamping means receiving slot for receiving said clamping means therein, and said clamping means movable in said slot between said retracted position and said clamping position; and said cam means further comprises:
  a generally cylindrical cam member having an engaging portion extendible into said clamping means receiving slot of said frame means for engaging said clamping means to move said clamping means between said retracted position and said clamping position thereof.

3. The arrangement defined in claim 2, wherein:
said cam control means further comprises:
  an arm member coupled to said cam member and extending radially outwardly therefrom for rotating said cam member to move said engaging portion of said cam member into and out of engagement with said clamping means; and
  an actuator member, operatively engaging said arm member for moving said arm member to cause rotation of said cam member.

4. The arrangement defined in claim 3, wherein:
said at least one of said first and second flange portions further comprises:
  a threaded aperture extending therethrough from said outer surface to said inner surface thereof; said actuator member further comprises:
  a threaded body portion threadingly engaging said threaded aperture in said at least one of said first and second flange portions, and having an outer end extending from said outer surface thereof and an inner end extending from said inner surface thereof; and
  a headed portion coupled to said outer end of said body portion, and said inner end of said body portion coupled to said arm member.

5. The arrangement defined in claim 4, wherein:
said web portion further comprises:
  walls defining a cam member receiving aperture therethrough in regions adjacent said clamping means receiving slot and having walls defining a communication passage between said cam member receiving aperture and said clamping means receiving slot; said cam member further comprises:
  a body portion rotatably mounted in said cam member receiving aperture and having a generally cylindrical outer surface portion comprising said engaging portion and a flat outer surface portion, whereby said cylindrical outer surface portion extends through said communication passage into said clamping means receiving slot to engage said clamping means for said clamping means in said clamping position thereof, and said flat outer surface portion aligned with said walls defining said clamping means receiving slot for said clamping means in said retracted position thereof.

6. The arrangement defined in claim 5, wherein:
said inner end of said body portion of said actuator member is movably coupled to said arm member.

7. The arrangement defined in claim 6, and further comprising:
anti-rotation means engaging said frame means and said mandrel shaft means for preventing relative rotation of said mandrel shaft means with respect to said frame means for the condition of said pipe machining tool rotating on said mandrel shaft means.

8. The arrangement defined in claim 7, wherein:
said anti-rotation means further comprises:
  peg means mounted on said at least one of said first and second flange portions and extending outwardly from the outer surface thereof.

9. The arrangement defined in claim 8, wherein:

said peg means comprises said head portion of said threaded body portion of said actuator member of said cam control means.

10. The arrangement defined in claim 3, wherein said mandrel shaft means is adjustably mountable on both said first and said second flange portions of said frame means, and said mounting means further comprises:

a first floating nut means movably mounted on said frame means adjacent said inner surface of said first flange portion and having a threaded aperture therein;

a second floating nut means movably mounted on said frame means adjacent said inner surface of said second flange portion and having a threaded aperture therein;

first walls in said first flange portion defining an access aperture therethrough from said outer surface to said inner surface thereof, and said access aperture larger than said threaded aperture of said first floating nut means, and said first floating nut means movable into a plurality of aligned positions wherein said threaded aperture of said first floating nut means lies within a projection of said access aperture; and first walls in said second flange portion defining an access aperture therethrough from said outer surface to said inner surface thereof and said access aperture larger than said threaded aperture of said second floating nut means, and said second floating nut means movable into a plurality of aligned positions wherein said threaded aperture of said second floating nut means lies within the projection of said access aperture in said second flange portion.

11. The arrangement defined in claim 10, and further comprising:

limiting means for limiting the movement of said first and said second floating nut means in planes substantially parallel to said outer surfaces of said first and said second flange portions, respectively, to provide the axis of said threaded aperture of said first and said second floating nut means substantially perpendicular to said outer surface of said first and said second flange portions, respectively.

12. The arrangement defined in claim 11, wherein: said limiting means further comprises:

walls in said web means adjacent said inner surface of each of said first and said second flange portions and defining slots therein;

pin means extending from said inner surface of each of said first and said second flange portions to said walls defining said slots adjacent thereto; and walls in said first and said second floating nut means defining a pin receiving aperture therethrough for movably engaging said pin means.

13. The arrangement defined in claim 12, wherein: said mandrel shaft means further comprises:

a threaded body member for receiving said pipe machining tool, and having an outer end and an inner end;

a base member coupled to said inner end of said body member and having an outer surface engageable with said outer surface of said first and said second flange portions, and said outer surface of said base member lying in a plane substantially perpendicular to the axis of said threaded body member, and said base member having walls defining a peg receiving aperture for engaging said peg means;

and said threaded body member and said base member having internal walls defining a drawbolt receiving aperture therethrough from said outer end of said body member to said outer surface of said base member; and a drawbolt means mountable in said drawbolt receiving aperture and extending therethrough, and said drawbolt having an inner threaded end engageable with said threaded apertures of said first and said second floating nut means, and having a headed portion positionable adjacent said outer end of said threaded body member.

14. The arrangement defined in claim 13, and further comprising:

a centering unit adapted to be slidingly received on said body member of said mandrel shaft means, and having at least three similar centering vanes extending longitudinally of and radially from said body member of said mandrel shaft means, and said at least three similar centering vanes adapted to engage at least one of said first and said second ends of said pipe bend for said centering unit slidably mounted on said mandrel shaft means and pressed adjacent said pipe bend to urge said mandrel shaft means toward the center of said at least one of said first and second ends of said pipe bend.

15. The arrangement defined in claim 13, wherein: the outer radial extremity of said at least three similar centering vanes adjacent a first end thereof is longitudinally tapered toward the axis of said centering unit to engage said inner surface of said pipe bend at said at least one of said first and second ends of said pipe bend.

16. The arrangement defined in claim 15, wherein: each of said at least three similar centering vanes is undercut at its second end spaced from said first end to form a longitudinal inward facing tapered surface which progresses outwardly from the axis of said centering unit in the direction of said other end and is engageable with the outer surface of said pipe bend adjacent said at least one of said first and second ends thereof.

17. The arrangement defined in claim 16, wherein: said locating plate means further comprises:

an externally threaded body member having an inner end and an outer end, and internal walls defining a bolt receiving aperture therethrough from said outer end to said inner end:

a locating plate bolt means extending through said bolt receiving aperture of said externally threaded body member and threadingly engageable with said first and said second floating nut means to bring said inner end of said externally threaded body member into engagement with said outer surfaces of said first and second flange portions; and spinner plate means threadingly engageable with said externally threaded body member and having an inner surface comprising said bearing surface for engagement with the ends of said pipe bend.

* * * * *